United States Patent [19]

Ainsburg

[11] Patent Number: 5,760,763
[45] Date of Patent: Jun. 2, 1998

[54] VIDEO DISPLAY ENHANCED POINTING CONTROL METHOD

[76] Inventor: David Ainsburg, 100 Hamburg St., Springfield, Mass. 01107

[21] Appl. No.: 657,019

[22] Filed: May 30, 1996

[51] Int. Cl.[6] .................................................. G06F 3/033
[52] U.S. Cl. ............................................................. 345/157
[58] Field of Search ..................................... 345/145, 157

[56] References Cited

U.S. PATENT DOCUMENTS

| | | | |
|---|---|---|---|
| 4,528,560 | 7/1985 | Bergermann et al. | |
| 4,691,199 | 9/1987 | Shell | |
| 4,720,703 | 1/1988 | Schnarel, Jr. et al. | |
| 4,734,685 | 3/1988 | Watanabe | 340/710 |
| 4,847,605 | 7/1989 | Callahan et al. | 340/709 |
| 4,963,858 | 10/1990 | Chien | 340/710 |
| 4,987,411 | 1/1991 | Ishigami | |
| 5,153,571 | 10/1992 | Takahashi | 340/710 |
| 5,164,713 | 11/1992 | Bain | |
| 5,195,179 | 3/1993 | Tokunaga | 395/161 |
| 5,239,168 | 8/1993 | Freeman | |
| 5,398,044 | 3/1995 | Hill | |
| 5,508,717 | 4/1996 | Miller | 345/145 |
| 5,543,590 | 8/1996 | Gillespie et al. | |
| 5,596,347 | 1/1997 | Robertson et al. | 345/145 |

FOREIGN PATENT DOCUMENTS 2 151 381A 7/1985 United Kingdom.

OTHER PUBLICATIONS

Arnaut, Lynn. and Greenstein, Joel. "Is Display/Control Gain a Useful Metric for Optimizing an Interface?", 1990, Human Factors pp. 651–663.

*Primary Examiner*—Mark R. Powell
*Attorney, Agent, or Firm*—Fishman, Dionne, Cantor & Colburn

[57] ABSTRACT

A method and apparatus for enhancing the operation of pointing devices currently in use with video display environments by reducing the amount of motion necessary to cause the movement of parts of the display over distances of the screen environment within existing pointing devices and pointing device control programs. This is accomplished by allowing the customary operation, of the pointing device, presently including computer "mice", "trackballs"; and "touchpads", or any similar device, within a predefined "select area". Within the select area, pointing and control functions are performed in the manner normal to the chosen supported controller device. Movement of the control device or cursor beyond this established range or select area invokes the "slide" function in which the cursor movement becomes automated, allowing the user to cause the cursor to traverse significant distances of the screen with little effort. The direction and speed of the cursor movement remains under the control of the user until the controller movement indicates the user's desire to return to the select area mode. A new select area is then re-established around the new position of the cursor. The amount of user movement necessary to accomplish tasks with the pointing device is reduced and the accuracy of pointing is enhanced. Preferred embodiments of the invention have been designed to be integrated with a broad range of the common input devices and input device control program designs currently available.

15 Claims, 5 Drawing Sheets

SLITS 5

FIG. 5B
PRIOR ART ated movement when
that area's limits are reached through a specific means
requiring the placement of the mouse or within a framework.

VIDEO DISPLAY ENHANCED POINTING CONTROL METHOD

BACKGROUND OF THE INVENTION

This invention relates to the use of devices to control the movement of a graphically displayed object or objects used within video environments.

The current art for the movement or positioning of a displayed object or objects, hereafter referred to by the common name "cursor", with control signals derived from manually operated input devices, takes two forms in general. One method uses the direction and distance the device is manipulated or moved, usually combined with the rate of speed used in manipulating or moving the device, to generate signals used to control the cursor positioning on the screen of a graphical interface or other computer application. This is the method common to devices known as "mice" and "trackballs", as well as various "touchpad" or "tablet and puck" methods of cursor control. The second method incorporates the factor of time into the cursor movement calculation by causing the cursor to continue moving as long as the device is held away from a center or "rest" position. This is the method used by devices commonly known as "joysticks" and "arrow keys".

U.S. Pat. No. 5,164,713 discloses an apparatus for limiting the movement of a typical computer mouse in order to define an area in which the mouse is controlled in an ordinary manner, and provides automated movement when that area's limits are reached through a specific means requiring the placement of the mouse or within a framework.

U.S. Pat. No. 5,289,168 discloses an apparatus for defining an area within which a controller may be moved, at the borders of which the movement of the controller activates new functions, including some movement functions.

U.S. Pat. No. 4,987,411 discloses an apparatus for causing the automated movement of a cursor or other on-screen object in response to the possibility of a desired object being placed in the direction of movement of the cursor or object.

U.S. Pat. No. 5,398,044 discloses a method for automating the movement of an on-screen object in response to a control button activation.

U.S. Pat. No. 4,720,703 discloses a means for panning a viewport area over an incompletely displayed area by means of cursor movement.

SUMMARY OF THE INVENTION

The present invention provides the user of an input device with a way of defining an area surrounding the current cursor or device position within which the input device may operate normally. Once the user has moved the input device so that the cursor or device position is exiting the limits of the area, the invention automates the movement of the cursor to allow the cursor travel in a direction and at a rate according to the prior movement of the controller without further effort on the user's part. The automated movement of the cursor continues until such time as the user signals a desire to modify or cease the cursor movement with the further movement of the input device, whereupon the invention responds in accordance with the input device movement by modifying the direction and/or speed of the cursor movement, or ceasing the automation of the movement, which results in the establishment of a new area of ordinary operation of the input device surrounding the new cursor or controller position. The invention is intended to be integrated with existing pointing devices and/or pointing device control programs.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

The method and apparatus of the present invention is employed in conjunction with the manipulation of an input device preferred by the user and supported by the invention, which includes at this time devices know as "mice", "trackballs", "touchpads", "tablets" (with or without pucks), as well as any other device from which movement signals may be digitally counted and reproduced.

Figure 1:
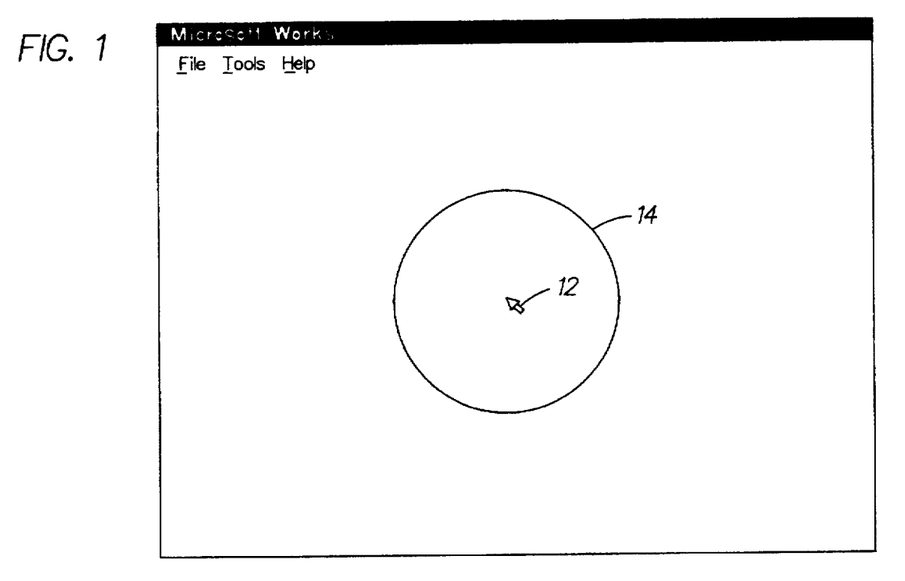
FIG. 1 is an illustration of the establishment of the initial stage of operation, described as the select area, in a preferred embodiment of the invention.
Figure 2:
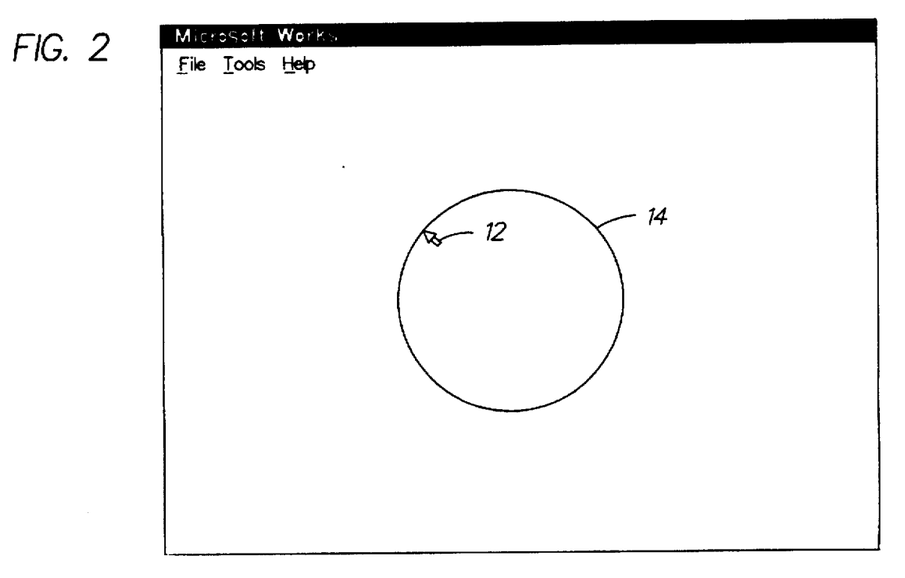
FIG. 2 is an illustration of the invention in a state just prior to the activation of the slide mode.
Figure 4:
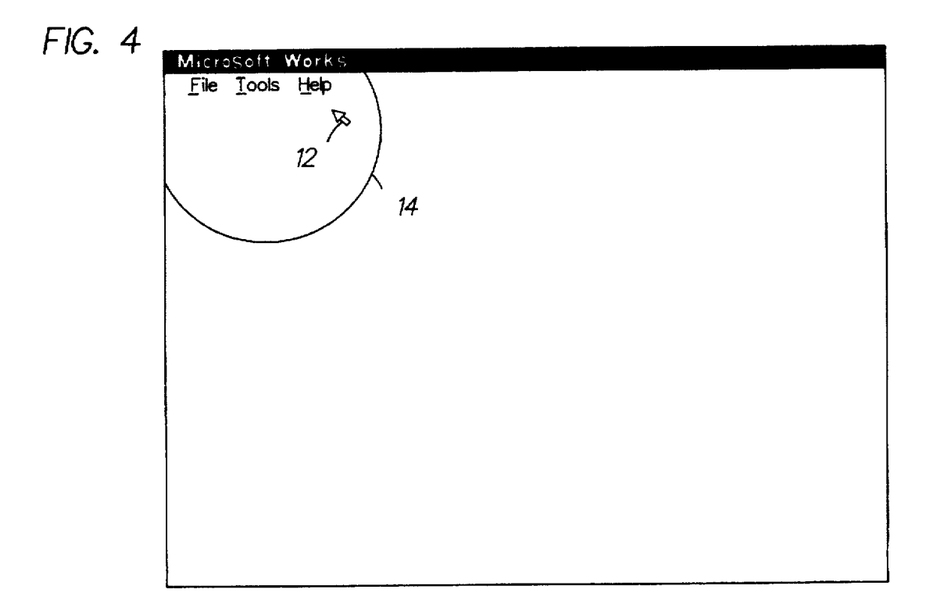
FIG. 4 is an illustration of the reestablishment of the select area.

Referring to FIG. 1, a sample screen of a commonly known program (Microsoft Works TM) which supports a graphical pointing device, with the establishment of a select area 14, which may be any preferred shape or size, surrounding the current position of the cursor 12, which allows pointing functions within the select area in the manner according to the input device's (not shown) characteristics is shown. The establishment of the select area 14 is done by defining the limitations of the area outside of which the movement functions of the cursor 12 will become automated. This is accomplished by counting and storing the number and type of movement signals generated by the user's chosen input device, and is referred to hereafter as a "counter function". While the controller is manipulated within the select area, each unit of movement in a given direction of the controller is executed in the accustomed manner of that controller. For example, in common input devices such as trackballs and mice, each unit of controller movement in a given direction is directly related to a unit of movement of the cursor or other movement function in a representative direction. The select area 14 shown in FIGS. 1, 2 and 4 is delineated by a visible outline, of which all, part, or none may be constantly or intermittently displayed in order to suit the needs of the user or application. Alternate mechanisms for displaying the extent of the select area may include alteration of cursor characteristics such as size, shape or color when approaching the boundaries of the select area, and audio or other signals which would be obvious to those skilled in the art. The counter method of establishing a select area and a visible display related to the select area allows for the adaptation of the configuration of the select area 14 to suit any preferred embodiment, and therefore represents substantial improvements over the prior art.

FIG. 2 shows the movement of the cursor 12 in response to the controller (not shown) within the select area 14 to a point which will activate the automation of the cursor movement, herein referred to as the slide mode.

Figure 3:
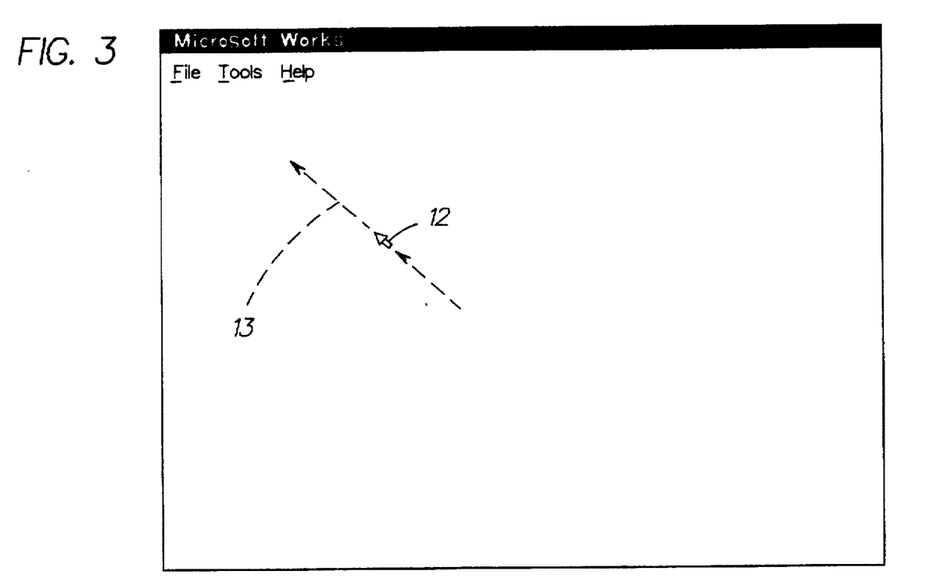
FIG. 3 is an illustration of the cursor movement in the slide mode.

FIG. 3 shows that the movement of the control device beyond the select area 14 results in the movement of the cursor 12 or other displayed object in the desired direction along a slide path 13 without the need for further controller movement. In slide mode, the cursor 12 continues in the direction that the cursor was moving before exiting the select area 14. The slide mode operates without excluding modification of the automated movement of the cursor 12 during the slide mode, or excluding other functions common to the controller being used, such as button presses. This allows the direction and speed of movement of the cursor 12 to remain under the control of the user until such time as the controller movement indicates the user's desire to cease the slide mode, and also allows the accustomed functionality of the controller during the slide mode. Control of the cursor 12 while in the slide mode may have a number of different characteristics to suit the user's needs, including that of controller movement further in the direction of current travel resulting in a corresponding increase in the rate of movement of the cursor 12, controller movement in the opposite direction either yielding a proportional reduction in the rate of travel of the cursor 12 until such predetermined point is reached as has been chosen for the select area 14 to be reenabled, or immediate cancellation of the continuous movement and restoration of the select area 14. Additionally, controller movement in a direction neither directly toward or away from the direction of movement while the slide mode is engaged may result in the modification of the direction of travel without cancellation of the slide mode. Such direction modification may include altering the characteristics of movement in the select area 14 in the modifying axis or altering the characteristics of movement in the slide mode in the modifying axis, or due to the plurality of movement axes and methods involved, comprising a combination and/or succession of these direction modifications. The comprehensive control of the movement of the cursor and the allowance of normal input device functions while in the slide mode represents significant advances over the prior art.

FIG. 4 shows the select area 14 re-established surrounding the new position of the cursor 12 after the controller movement has canceled the slide mode, allowing for the resumption of control of the cursor 12 according to the controlling device's accustomed characteristics. The placement and characteristics of the select area 14 around the cursor 12 both initially and upon cessation of the slide mode may be varied to suit any desired purpose, including being centered around the cursor 12, or, in the case of the establishment of the select area 14 after cessation of the slide mode, being returned to the position relative to the cursor 12 that existed immediately before the activation of the slide mode, or being placed at a further predetermined area relative to the cursor 12 position, according to the characteristics of the preferred embodiment.

Figure 5A:
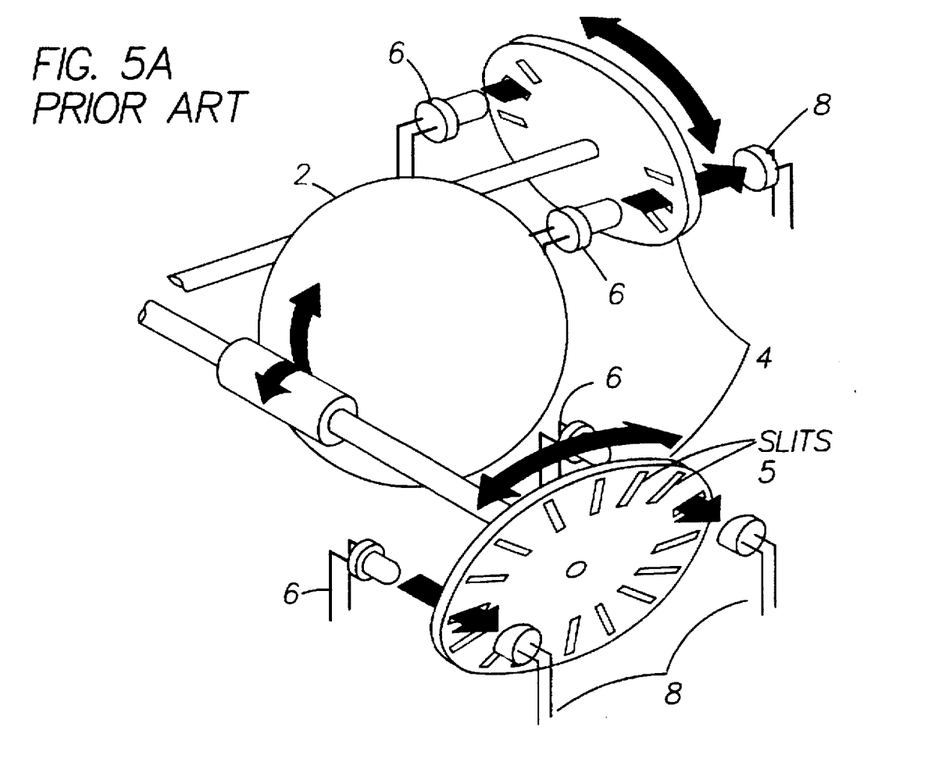
FIG. 5A is a perspective view of a conventional device for generating movement signals for the control of displayed objects used in current pointing devices.

An optomechanical mouse for translating manual movement of a controller into signals for controlling the movement of a graphically displayed object is shown in FIG. 5A.

The optomechanical mouse, in computer science, is a type of mouse in which motion is translated into directional signals through a combination of optical and mechanical means. The optical portion includes pairs of light-emitting diodes (LEDs) 6 and matching sensors 8; the mechanical portion consists of rotating wheels 4 with cutout slits 5. When the mouse is moved, the wheels 4 turn and the light from the LEDs 6 either passes through the slits 5 and strikes a light sensor 8 or is blocked by the solid portions of the wheels 4. These changes in light contact are detected by the pairs of sensors 8 and interpreted as indications of movement. Because the sensors 8 are slightly out of phase with one another, the direction of movement is determined by which sensor 8 is the first to regain light contact.

Figure 5B:
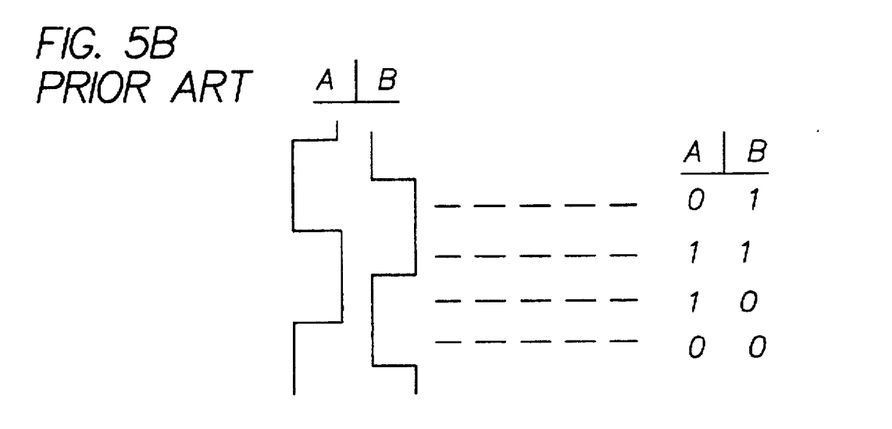
FIG. 5B illustrates the pulse trains and equivalent digital signals produced by the conventional device depicted in FIG. 5A.

As shown by the pulse train depiction in FIG. 5B, the result of the signals produced by the optical sensors 8 in response to the motion of the controller ball 2 is the generation of a pair of pulse trains per movement axis involved, with one train leading and one retarded relative to the other to indicate the direction of travel (+ or −) in that axis. Reversing the relative lead and retardation sequencing of the two pulse trains, so that the previously retarded one is now the lead and vice versa, indicates a reversal of the direction of travel of the controller along that axis to the electronics used to encode and transmit the movement signal to the host display means (not shown). The accompanying digital table in FIG. 5B shows the digital equivalents of the paired pulse trains from one set of paired sensors, with the sample being that of one light/dark cycle from beginning to end, with the output from each specific sensor labeled as A or B. The output signals from the optical sensor 8 are converted to digital signal parameters in common usage, therefore the use of the digital truth table in FIG. 5B to clarify the workings of the invention is appropriate.

Figure 6:
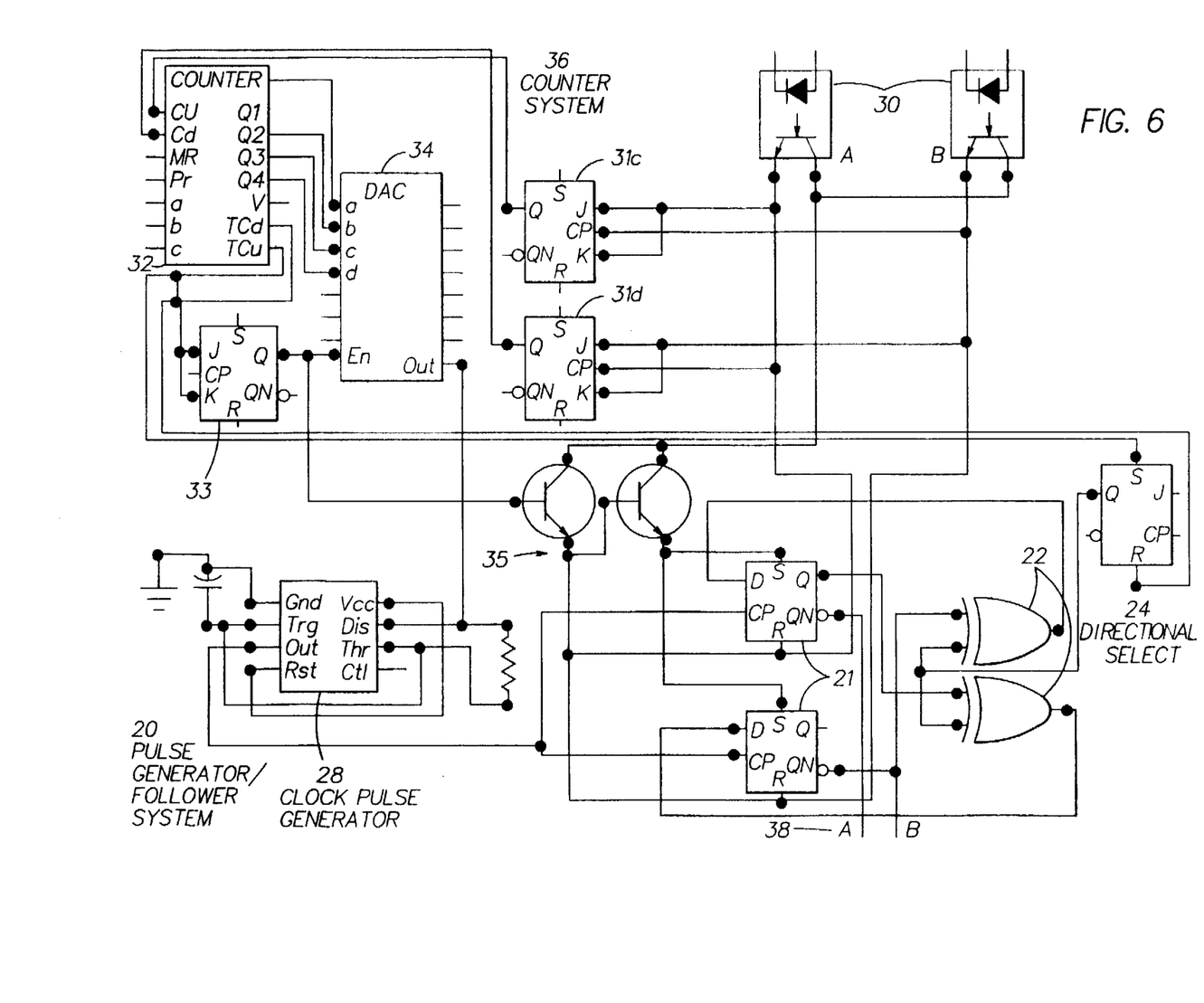
FIG. 6 is a schematic diagram of circuitry of the present invention for integration with existing pointing devices.

In FIG. 6, the LED's 6 and the sensors 8 are represented by the combined optoisolator symbols 30. The exemplary circuit shown in FIG. 6 duplicates the output of one optical sensor pair in a way that allows for the generation of controllable continuous movement signals in a manner compatible with industry standard mouse/trackball controller chips, such as the MTA 41110 by Microchip (sold by Trinity Technologies). The use of one of the exemplary circuits in FIG. 6 for each movement axis of the input device allows for the automation of movement in both axes of the input device, thereby creating the slide mode of the invention.

The circuitry of this embodiment includes paired flip-flops (FF) 21 modified by the addition of exclusive OR gates (XOR) 22 to achieve both the required timing relationship and permit the reversal of the pulse train timing relationship to indicate a reversal of movement direction, with the desired paired pulse trains being output from the Qn outputs of the paired FF's 21. The reversal is accomplished by the varying the signal to the B inputs 24 of the XOR gates 22. A HIGH signal initiates the operation of the device in the opposite state that a LOW signal does.

In addition to the primary function of pulse train generation, the FFs 21 are also used as followers for the existing optical signal generation system 30, which allows the continuous pulse generator 20 to be integrated into the existing circuitry between the optomechanical signal generation system 30 and the signal transmission circuitry (not shown) of the input device. Using an active LOW FF, maintaining the SET inputs of the FF's 21 in the active condition while using the pulse train signals generated by the optical mechanism 30 to cycle the RESET inputs of the FF's 21 HIGH and LOW will produce a following condition on the outputs 38 from the pulse generation system 20, thereby eliminating the need for output switching means between the optical system 30 and pulse generation system 20 to the input device controller circuitry (not shown) and resulting in a significant decrease in the apparatus otherwise necessary to implement the invention.

The circuitry for activation of the slide mode produced by the continuous pulse generator 20 is comprised of a counter circuit 36 for monitoring the outputs from the optoelectronic mechanism 30 and incorporating a switching circuit 35. The counter circuit 36, comprises up flip-flop 31u, down flip-flop 31d, a counter 32, digital to analog ramp circuit 34, and a toggle flip-flop 33. The counter circuit 36 provides for determining the select area 14 and for controlling the rate of movement of the cursor after activation of the slide mode. Other specific circuitry may be added into the counter circuits to allow the creation and delineation of the select area 14 in any desired configuration. Upon the fulfillment of the desired requirements of the counter circuit 36, the switching circuit 35 is activated and changes the SET and RESET inputs of the FFs 21 to an inactive condition which allows the FF's 21 to respond to a clock signal generator circuit 28 which is activated and controlled by the counter circuit 36. This allows the continuous pulse generator 20 to replace the signals from the optical apparatus 30 (normally passed via the passive following function of the FF circuit 20 to the electronics of the chosen controller device) with continuous pulse trains from the active generating function of the FF circuit 20, thereby creating the "slide mode" operation for that axis. In this exemplary embodiment, the output from the counter circuit 36 also controls the rate of signal generation by the clock pulse generator 28 which provides further control of the cursor 12 while the slide function is being maintained.

Flip-flops 31u and 31d are connected to the optical signal generation system 30 so that FF 31u counts in a first direction or "up" and FF 31d counts in the opposite direction or "down." These signals are fed to the up and down inputs of counter 32. The counter 32 may be initialized to a value within the middle of its count range if the counter 32 is not able to count below zero. It will be noted that if the counter cannot count below zero, the speed of the slide will not be varied in that direction. The counter is initialized to the center of it's total count range because the cursor is initialized in the center of the select area. The counter, if able to count both directions at all, will count both above TCu and below TCd. This provides the variability of speed during slide. When the Total count up or the Total count down is reached, either TCu or TCd is enabled thus toggling flip-flip 33. The output of FF 33 is connected to the enable input of digital to analog convertor (DAC) 34 and to switching transistors 35. When the output of FF 33 goes high, the switching transistors 35 are turned on and the set and reset inputs of FF's 21 are connected to logic high or inactive state. In addition, the DAC 34 produces a signal at the out terminal which provides a voltage to the clock pulse generator 28. At this time, movement of the cursor or object is controlled by a pulse train produced by the clock pulse generator 28. As the count at counter 32 increases, the voltage to the clock pulse generator 28 increases and this increases the speed of the object. Thus, the invention provides a slide mode having variable speed as the control device is moved further outside of the select area. If the control device is moved to within the select area, either TCd or TCu of counter 32 is toggled which disables the output of FF 33 and DAC 34. The FF's 21 return to follow mode and output the signal received at the input optical signal generation system 30.

The result of integrating circuitry such as shown here into the circuitry for each movement axis of a common device such as a trackball or mouse is to allow the input device to operate in it's accustomed fashion until the input device movement causes the set limits of the counter circuit 36 to be exceeded, thus defining the limitation of the select area 14 for that axis at that point and activating the slide mode. When the user's movement of the controller results in the pulse count detected by the counter circuit 36 to be returned to within the set limits, the slide mode is disabled, which results in the select area 14 being reestablished surrounding and relative to the new cursor position. This embodiment provides an electronically implemented embodiment intended for integration into an existing input device. Due to the broad range of electronic technology, a wide variety of electronic circuits within the scope of the invention, may be realized by the skilled artisan.

Figure 7:
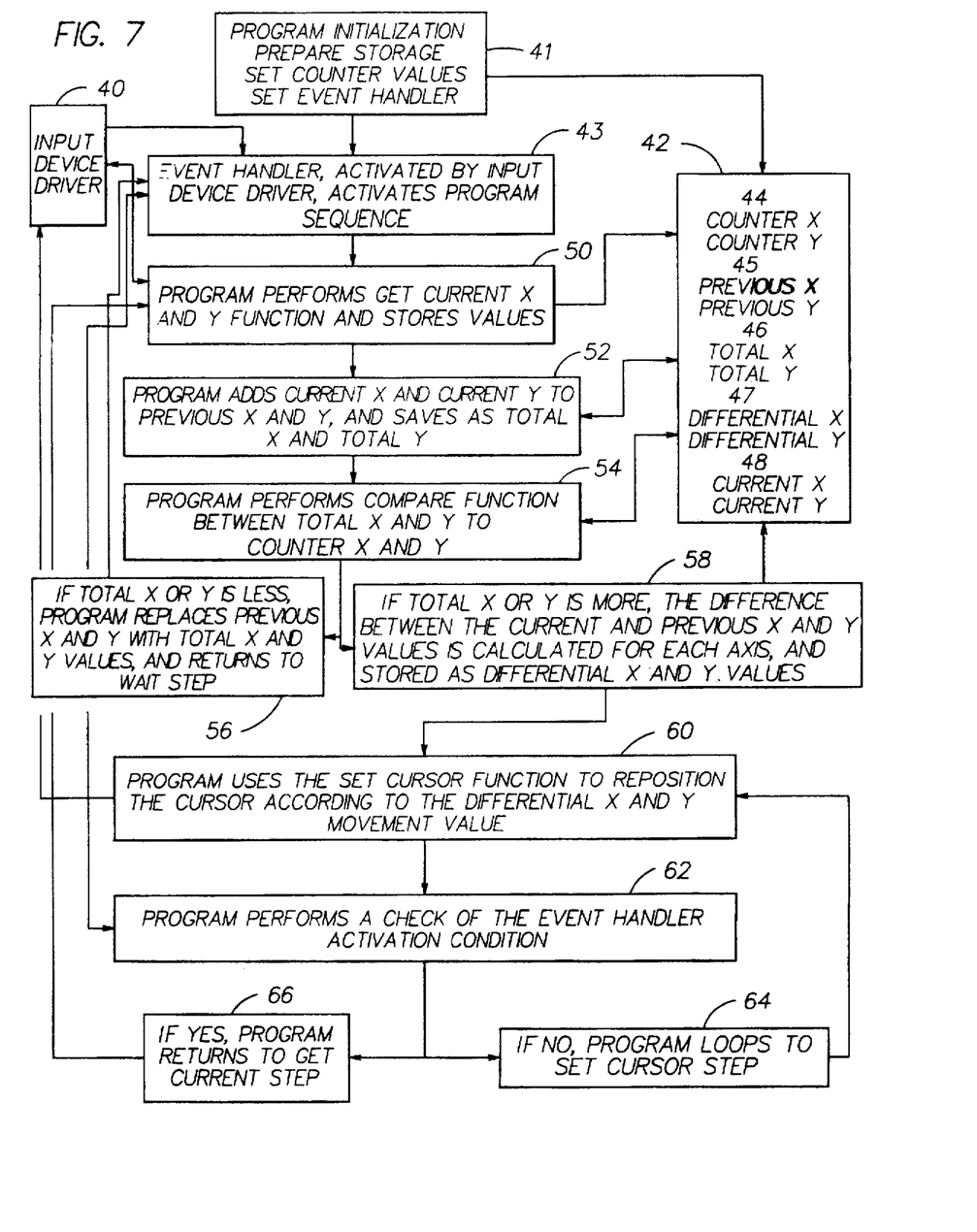
FIG. 7 illustrates computer implemented modules to be used in conjunction with existing input device control programs.

FIG. 7 illustrates the relationship between program sequences and devices in a computer implemented embodiment of the invention, which is shown operating in conjunction with an existing input device control program, also knows as a "driver". The computer implemented embodiment of the invention may be implemented on any general purpose computer. In addition, a computer readable storage medium may store the program modules which may be loaded into and/or executed by a computer, the computer becoming an apparatus for practicing the invention. As shown in FIG. 1, there exists a defined limit to the select area 14. The preferred configuration of the select area 14, including size, shape, and apparent cursor movement to input device movement ratio, is determined by the setting of conditions comprised of cursor or input device movement values that are specified before the slide function is activated. The specific means by which conditions are set and realized to be fulfilled in computer programs are commonly known and herein referred to as "counter functions".

Referring to FIG. 7, the program's initialization sequence 41 is comprised of the setting of activation conditions for the program, the desired values comprising the select area's delineation, and the preparation of a storage device for the values necessary to the operation of this embodiment. The activation mechanism for the program in this embodiment is comprised of a preliminary program referred to as an "event handler" 43 used to set a "call mask" function of the input device driver 40 which causes the input device driver 40 to activate a predetermined program upon the occurrence of predefined input device events such as movement of the device. In this embodiment, the event handler 43 will be activated by the input device driver 40, and in turn activate the programming sequence of the invention. Alternatively, other common methods such as using the system timer to activate the program may be used if appropriate and desired. The storage device 42 may be comprised of known programming elements including "stacks" and/or "registers", and contain areas for the retention of X and Y axis movement values for the Counter 44, Previous 45, Total 46, Differential 47, and Current 48 values, and any other values desired for the operation of the invention, such as additional movement values.

Upon the movement of the input device, the input device driver 40 activates the programming sequence. Program sequence 50 then performs an action such as a "Get Mouse Movement" function (Function 11 of Microsoft compatible drivers), or other equivalent, to read the movement values that have occurred in the input device or cursor X and Y axes since the last call of that function. Program sequence 50 then stores the received values in the Current X and Y areas 48 of the storage device 42, and proceeds to sequence 52, in which the contents of the Previous X and Y areas 45 are modified by the contents of the Current X and Y areas 48 in order to generate values to be placed in the Total X and Y areas 46. The next step, shown in sequence 54, performs a Compare function between the contents of the Counter X and Y areas 44 and the Total X and Y areas 46 to determine if the boundaries of the predetermined select area 14 have been exceeded. After this action, sequence 54 incorporates "If . . . then" or other functionally equivalent logic to determine the appropriate action to take for each of the possible results. If the value stored for either axis of the Total X and Y area 46 is less than the value for the same axis of the Counter X and Y areas 44, program sequence 56 is is activated to replace the values in the Previous X and Y area 45 with the appropriate values from the Total X and Y area 46, and return the program to waiting for activation from the input device driver 40. If the value stored for either axis of the Total X and Y area 46 is more than the value for the same axis of the Counter X and Y areas 44, indicating that the user of the input device has exceeded the boundaries of the select area 14, program sequence 58 is activated to determine the difference between the appropriate values of the Current X and Y area 48 and the Previous X and Y area 45 for each axis, and store the value for each axis in the appropriate section of the Differential X and Y area 47. This sequence defines a movement "track" for the input device and therefore the cursor 12, so that the direction and rate of input device and/or cursor movement has been detected and may be used by the program for the slide mode.

The next step is the generation of the slide mode of the invention by sequence 60, which uses the values of the Differential X and Y area 47 to generate new position values for the cursor 12, and accomplish the repositioning of the cursor 12 by the exemplary use of the Set Cursor function (Function 4 for Microsoft compatible drivers), although any functional equivalent that would serve to implement the method of the invention may be used if preferred. Once this action has been performed, sequence 62 checks the event handler 43 to ascertain if the input device driver 40 has signaled movement during the time the program has been operating, and performs another "If . . . then" or functionally equivalent sequence. If the event handler 43 signals that the input device driver 40 has not indicated input device movement during the program execution time, the sequence 64 loops to sequence 60 and continues again from that point, which results in the automation of the cursor movement without further user input. If the event handler 43 signals that the input device driver 40 has indicated input device movement during the program's execution time, sequence 66 loops to sequence 50 to repeat the main program sequences from that point, thereby providing a method of alternating the direction and rate of or the canceling of the automated cursor movement at the user's request.

The computer implemented embodiment of the invention is intended for integration with a broad range of input device driver programs and their attendant devices. Due to the large number of software programming languages and devices, an extensive variety of alternative embodiments are possible within the scope of the invention and are recognized by the skilled artisan.

The invention provides a simple, controllable system for enhancing the use of input devices with a visual display that overcomes notable limitations of the prior art, such as the limiting of automated cursor travel to orthogonal directions, bulky apparatus within which the input device must be placed, or additional user control button activations to implement motion. The invention also provides an improved ability over joystick type devices to precisely position the object or objects being controlled, while providing equal or superior mobility over the display area. Additionally, the invention is well suited to improving the operability of touchpad or tablet devices, as the center of the pad or tablet area may easily be defined as the select area, and the surrounding edges or border of the pad as the area invoking the slide mode in the appropriate direction, which allows the pad or tablet to be created in any desired shape without limiting the operating area of the device. The depiction of manipulating on-screen objects referred to herein is considered to include all common forms such as the positioning of certain separate and distinct objects within the visual display, such as a cursor, pointer, or a highlighted block in a video environment, or the manipulation of the entirety of the parts of the viewable screen in order to provide the illusion of movement, as is done in applications knows as "three dimensional", "first person perspective", "virtual reality" or "simulators".

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for controlling the position of an object on a display, the motion of the object controlled by a control device which produces a series of pulses representing motion of the object on the display, the method comprising:

counting the number of pulses produced by said control device;

comparing the number of pulses to a limit;

determining if the number of pulses exceeds the limit; and controlling the position of the object based on previous movement of the object if the count of the number of pulses exceeds the limit.

2. The method of claim 1 wherein the step of counting comprises, for each respective axis of motion, increasing the count when the control device is moved in a first direction along the axis and decreasing the count when the control device is moved in a direction opposite to said first direction.

3. The method of claim 1 wherein the step of controlling comprises moving the object on the display in a direction the control device was moving prior to the pulse count exceeding the limit.

4. The method of claim 1 wherein the step of controlling comprises controlling the speed of the object based on the number of counts the pulse count exceeds the limit.

5. An apparatus for controlling the position of an object on a display, the motion of the object controlled by a control device which produces a series of pulses representing motion of the object on the display, the apparatus comprising:

a follower circuit for producing an output signal corresponding to the series of pulses produced by the control device;

a counter system for counting the pulses produced by the control device;

a pulse generator for providing an independent series of pulses; and a switching circuit, responsive to said counter system, for disconnecting said follower circuit from the control device and connecting said follower circuit to said pulse generator.

6. The apparatus of claim 5 wherein said counter system comprises a counter for counting the series of pulses produced by the control device and a digital to analog convertor for converting an output of said counter to a voltage.

7. The apparatus of claim 6 wherein the independent series of pulses produced by said pulse generator is dependent upon said voltage.

8. The apparatus of claim 6 wherein said counter includes a count limit and said switching circuit connects said follower circuit to said pulse generator when said counter exceeds the limit.

9. A storage medium encoded with machine-readable computer program code for controlling the position of an object on a display, the motion of the object controlled by a control device which produces a series of pulses representing motion of the object on the display, the storage medium comprising:

means for causing a computer to count the number of pulses produced by said control device;

means for causing the computer to compare the number of pulses to a limit;

means for causing the computer to determine if the number of pulses exceeds the limit; and means for causing the computer to control the position of the object based on previous movement of the object if the count of the number of pulses exceeds the limit.

10. The storage medium of claim 9 wherein the means for causing the computer to count comprises, for each respective axis of motion, means for causing the computer to increase the count when the control device is moved in a first direction along the axis and decrease the count when the control device is moved in a direction opposite to said first direction.

11. The storage medium of claim 9 wherein said means for causing the computer to control the position of the object comprises means for causing the computer to move the object on the display in a direction the control device was moving prior to the pulse count exceeding the limit.

12. The storage medium of claim 9 wherein said means for causing the computer to control the position of the object comprises means for causing the computer to control the speed of the object based on the number of counts the pulse count exceeds the limit.

13. A method for controlling the position of an object on a display, the motion of the object controlled by a control device which produces a series of pulses representing motion of the object on the display, the method comprising:

counting the number of pulses produced by said control device;

comparing the number of pulses to a limit, the limit corresponding to an area surrounding the object;

determining if the number of pulses exceeds the limit; and controlling the position of the object based on previous movement of the object if the count of the number of pulses exceeds the limit.

14. The method of claim 13 wherein when the number of pulses exceed the limit, the position of the object is controlled based on movement of the object before the count of the number of pulses exceeds the limit in combination with current movement provided by the control device.

15. A method for controlling the position of an object on a display, the motion of the object controlled by a control device which produces a series of pulses representing motion of the object on the display, the method comprising:

counting the number of pulses produced by said control device;

comparing the number of pulses to a limit;

selecting one of a first mode and a second mode based on said comparing;

in said first mode, controlling the position of the object based on current pulse counts; and in said second mode, controlling the position of the object based on previous pulse counts.

* * * * *